US011541943B2

(12) United States Patent
Okamura et al.

(10) Patent No.: US 11,541,943 B2
(45) Date of Patent: Jan. 3, 2023

(54) ELECTRIC VEHICLE HAVING LOW-VOLTAGE COMPONENT IN REAR PORTION OF VEHICLE BODY

(71) Applicants: TOYOTA JIDOSHA KABUSHIKI KAISHA, Aichi (JP); SUBARU CORPORATION, Tokyo (JP)

(72) Inventors: Junya Okamura, Tokyo-to (JP); Iwao Furukawa, Tokyo-to (JP)

(73) Assignees: TOYOTA JIDOSHA KABUSHIKI KAISHA, Aichi-Ken (JP); SUBARU CORPORATION, Tokyo (JP)

(*) Notice: Subject to any disclaimer, the term of this patent is extended or adjusted under 35 U.S.C. 154(b) by 63 days.

(21) Appl. No.: 17/017,684

(22) Filed: Sep. 11, 2020

(65) Prior Publication Data
US 2021/0094622 A1    Apr. 1, 2021

(30) Foreign Application Priority Data
Sep. 27, 2019   (JP) .............................. JP2019-177466

(51) Int. Cl.
*B60K 1/04*    (2019.01)
*B62D 25/20*    (2006.01)
(Continued)

(52) U.S. Cl.
CPC ............ *B62D 25/2027* (2013.01); *B60K 1/04* (2013.01); *B60L 15/20* (2013.01); *B60L 50/66* (2019.02);
(Continued)

(58) Field of Classification Search
CPC .... B60K 1/04; B62D 25/027; B62D 25/2027; B60L 50/66; B60L 15/20; B60R 16/02
See application file for complete search history.

(56) References Cited

U.S. PATENT DOCUMENTS 9,037,334 B1*   5/2015   Cole ..................... B60W 10/06
                                                           701/22
2009/0166116 A1*   7/2009   Kiya ....................... B60L 50/64
                                                         180/68.5

(Continued)

FOREIGN PATENT DOCUMENTS

CN           104271405 A      1/2015
JP           2007253933 A     10/2007
(Continued)

OTHER PUBLICATIONS

Toyota Technical Reports No. 31263, issued Aug. 31, 2018, 7pp.

*Primary Examiner* — James A English
*Assistant Examiner* — James J Triggs
(74) *Attorney, Agent, or Firm* — Hauptman Ham, LLP

(57) ABSTRACT

An electric vehicle may include a body; a low-voltage component disposed in a rear portion of the body; and at least one coupling member securing the low-voltage component to a plurality of securing portions of the body. The plurality of securing portions may include at least one first securing portion located forward of the low-voltage component in a vehicle front-rear direction and at least one second securing portion located rearward of the low-voltage component in the vehicle front-rear direction. A center of the at least one first securing portion and a center of the at least one second securing portion are located at different positions from each other in a vehicle vertical direction.

19 Claims, 8 Drawing Sheets

(51) Int. Cl.
  *B60R 16/02*   (2006.01)
  *B60L 50/60*   (2019.01)
  *B60L 15/20*   (2006.01)
  *B62D 21/15*   (2006.01)

(52) U.S. Cl.
  CPC ...... *B60R 16/02* (2013.01); *B60K 2001/0438* (2013.01); *B62D 21/15* (2013.01)

(56) References Cited

U.S. PATENT DOCUMENTS

2015/0043132 A1   2/2015   Miyashita et al.
2019/0047393 A1   2/2019   Kato et al.

FOREIGN PATENT DOCUMENTS

| JP | 2007276605 A | 10/2007 |
| JP | 201713593 A | 1/2017 |
| JP | 201931251 A | 2/2019 |

* cited by examiner

ELECTRIC VEHICLE HAVING LOW-VOLTAGE COMPONENT IN REAR PORTION OF VEHICLE BODY

CROSS-REFERENCE TO RELATED APPLICATION

This application claims priority to Japanese Patent Application No. 2019-177466, filed on Sep. 27, 2019, the entire contents of which are incorporated herein by reference.

TECHNICAL FIELD

The technique disclosed herein relates to an electric vehicle. The electric vehicle herein broadly means vehicles that include a motor configured to drive wheel(s). The electric vehicle includes, for example, an electric vehicle charged with external power, a hybrid vehicle including a motor and an engine, a fuel cell vehicle powered by a fuel cell, and the like.

BACKGROUND

"Toyota Technical Reports (Toyota Gijutsu Kokaishu)" (Issuance No. 31263, issued on Aug. 31, 2018) published by TOYOTA MOTOR CORPORATION describes a technique for protecting a high-voltage component of an electric vehicle in a rear-end collision. The high-voltage component herein means an electrical component configured to operate at an AC voltage exceeding 30 volts or a DC voltage exceeding 60 volts. The high-voltage component includes, for example, a motor configured to drive wheel(s) and a power control unit configured to control power supplied to the motor.

SUMMARY

As described in the above-mentioned document, electric vehicles require a technique for protecting their high-voltage component in a rear-end collision. In this regard, the high-voltage component is preferably disposed away from a rear surface of the vehicle so as not to be damaged in a rear-end collision. In contrast to this, a low-voltage component, which is not classified as the high-voltage component, may be disposed rearward of the high-voltage component in a vehicle front-rear direction. However, the low-voltage component disposed in a rear portion of the vehicle body could be pushed forward in a rear-end collision, which may cause damage to the high-voltage component, for example. The present disclosure provides a technique that suppresses forward intrusion of a low-voltage component in a rear-end collision.

An electric vehicle disclosed herein may include a body; a low-voltage component disposed in a rear portion of the body; and at least one coupling member securing the low-voltage component to a plurality of securing portions of the body. The plurality of securing portions may include at least one first securing portion located forward of the low-voltage component in a vehicle front-rear direction and at least one second securing portion located rearward of the low-voltage component in the vehicle front-rear direction. A center of the at least one first securing portion and a center of the at least one second securing portion are located at different positions from each other in a vehicle vertical direction.

According to the above-described structure, when a rear-end collision occurs to the electric vehicle, a compressive force is applied to the low-voltage component in the vehicle front-rear direction from the at least one first securing portion and the at least one second securing portion of the body. The at least one first securing portion located forward of the low-voltage component and the at least one second securing portion located rearward of the low-voltage component are located at different positions from each other in the vehicle vertical direction. Thus, when receiving the compressive force from the body, the low-voltage component is not simply pushed forward but changes its orientation by rotating upwardly or downwardly. This suppresses forward movement of the low-voltage component, and hence can avoid intrusion of the low-voltage component into a high-voltage component such as a motor or into another element, or reduce a degree of the intrusion.

DETAILED DESCRIPTION

Figure 1:
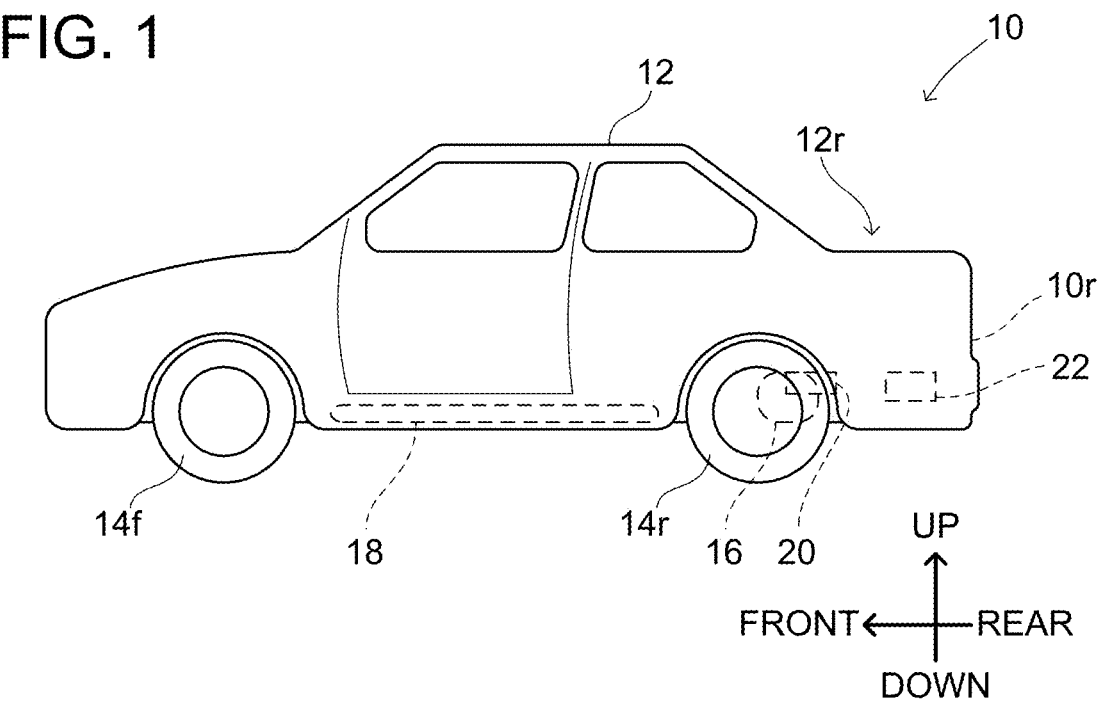
FIG. 1 is a side view schematically showing an entire configuration of an electric vehicle 10.

In an embodiment of the present technique, a center of at least one first securing portion may be located higher than a center of at least one second securing portion in a vehicle vertical direction. In such a configuration, a low-voltage component is pushed upward when receiving a compressive force from the body in a rear-end collision. Usually, a luggage compartment is located in a rear portion of the body, and an important element such as a high-voltage component is barely disposed higher in the vehicle vertical direction than the low-voltage component. Therefore, the configuration that allows the low-voltage component to be pushed upward can effectively suppress intrusion of the low-voltage component into other important element.

In an embodiment of the present technique, the body may include a rear floor panel forming a floor at the rear portion of the body, and a back panel located rearward of the low-voltage component and to which a rear end of the rear floor panel is connected. In this case, the at least one first securing portion may be located on the rear floor panel, and the at least one second securing portion may be located on the back panel.

In an embodiment of the present technique, the rear floor panel may include a front area including the at least one first securing portion, and a rear area extending between the front area and the back panel and recessed downwardly with respect to the front area. In this case, the low-voltage component may be disposed in a recess defined by the back panel and the rear area of the rear floor panel.

In the above-described embodiment, the low-voltage component may be entirely below the front area of the rear floor panel. In other words, the entirety of the low-voltage component may be accommodated in the above-described recess. Such a configuration facilitates placement of another element having a larger size than the low-voltage component, such as a spare tire, at a position higher in the vehicle vertical direction than the low-voltage component.

In an embodiment of the present technique, at least one coupling member may include a first bracket configured to secure the low-voltage component to the at least one first securing portion of the body and a second bracket configured to secure the low-voltage component to the at least one second securing portion of the body. Each of the first and second brackets may be configured of a single bracket component or may be configured of a plurality of bracket components.

In place of or in addition to the above, the at least one coupling member may include a brace extending in the vehicle front-rear direction. In this case, a front end of the brace may be secured to the at least one first securing portion, and a rear end of the brace may be secured to the at least one second securing portion. In other words, the low-voltage component may be secured to both of the at least one first securing portion and the at least one second securing portion with a single coupling member.

In the above-described embodiment, the brace may include a bend located between the front end and the rear end. In this case, the bend may be located higher in the vehicle vertical direction than a straight line connecting the front end and the rear end. According to such a configuration, when a rear-end collision occurs to the electric vehicle, a compressive force is applied to the brace, which extends in the vehicle front-rear direction, from the rear end toward the front end. At this time, since the bend is present at an intermediate position of the brace, the brace deforms to bend at the bend. In particular, the bend of the brace is located higher in the vehicle vertical direction than the straight line connecting the front end and the rear end of the brace. The brace therefore bends to cause the bend to protrude upwardly (i.e., in a mountain fold shape), which moves the low-voltage component upwardly. This further suppresses forward movement of the low-voltage component.

In an embodiment of the present technique, the center of the at least one first securing portion and the center of the at least one second securing portion may be at different positions from each other in a vehicle lateral direction. In such a configuration, when receiving a compressive force from the body in a rear-end collision, the low-voltage component changes its orientation by rotating leftward or rightward. This further suppresses forward movement of the low-voltage component. In another embodiment, if the center of the at least one first securing portion and the center of the at least one second securing portion are at different positions from each other in the vehicle lateral direction, these centers may not be at different positions from each other in the vehicle vertical direction.

In an embodiment of the present technique, the electric vehicle may further include a high-voltage component located forward of the low-voltage component in the vehicle front-rear direction. Since the present technique can prevent forward intrusion of the low-voltage component in a rear-end collision, even though the high-voltage component is disposed forward of the low-voltage component in the vehicle front-rear direction, intrusion of the low-voltage component into the high-voltage component can be avoided or the degree of the intrusion can be reduced. Here, "the high-voltage component located forward of the low-voltage component in the vehicle front-rear direction" means that at least a part of the high-voltage component is located forward of a front end of the low-voltage component in the vehicle front-rear direction, regardless of the positional relations between the high-voltage component and the low-voltage component in the vehicle vertical direction and the vehicle lateral direction.

The high-voltage component may include at least one selected from a group consisting of a motor configured to drive a wheel and a power control unit connected to the motor. This is because such a motor and an electrical component are typical examples of the high-voltage component that operates at a high voltage and should be highly protected against intrusion of the low-voltage component. In some embodiments, disposing the motor and the power control unit close to the wheel may result in that they are located forward of and/or below the low-voltage component located in the rear portion of the vehicle.

In the above-described embodiment, at least a part of the low-voltage component and at least a part of the high-voltage component may be at the same position in a vehicle lateral direction. According to the present technique, forward intrusion of the low-voltage component in a rear-end collision can be suppressed. Thus, even in the above configuration, the high-voltage component can avoid intrusion of the low-voltage component or the degree of the intrusion can be reduced.

In the above-described embodiment, a center of gravity of the high-voltage component may be offset to one side in the vehicle lateral direction from a center of gravity of the low-voltage component. In this case, the center of the at least one second securing portion may be offset to another side in the vehicle lateral direction from the center of the at least one first securing portion. Such a configuration enables the low-voltage component to be pushed away from the high-voltage component in the vehicle lateral direction, when the low-voltage component receives a compressive force from the body in a rear-end collision. This can effectively avoid intrusion of the low-voltage component into the high-voltage component or reduce the degree of the intrusion.

In the present technique, the low-voltage component may be an electronic control unit including at least one processor. In other words, the low-voltage component may be relatively large in size and weight. As an example, the low-voltage component may have a weight, for example, equal to or larger than 500 grams, or a weight equal to or larger than 1 kilogram.

In the disclosure herein, a simplified phrase "front-rear direction" means a front-rear direction of the electric vehicle. Similarly, a simplified phrase "lateral direction" means a lateral direction of the electric vehicle, and a simplified phrase "vertical direction" means a vertical direction of the electric vehicle. For example, when the electric vehicle is placed on a horizontal surface, the vertical direction of the electric vehicle coincides with the vertical direction. Moreover, the lateral direction of the electric vehicle is a direction parallel to an axle of the electric vehicle, and the front-rear direction of the electric vehicle is a direction parallel to the horizontal surface and perpendicular to the axle of the electric vehicle.

Representative and non-limiting specific examples of the present disclosure will hereinafter be described in detail with reference to the drawings. The detailed description is simply intended to show details for implementing preferable examples of the present disclosure to those skilled in the art, and is not intended to limit the scope of the present disclosure. Moreover, additional features and disclosures disclosed below may be used separately from or together with other features and techniques to provide electric vehicles further improved.

Moreover, a combination of features and steps disclosed in the detailed description below is not essential for implementing the present disclosure in the broadest sense, but is described only for explaining, in particular, representative specific examples of the present disclosure. Furthermore, when an additional and useful embodiment of the present disclosure is to be provided, various features of the representative specific examples described above and below, and various features recited in the independent and the dependent claims do not need to be combined in accordance with the specific examples herein described or the order in which they are listed.

All features described in the present specification and/or the claims are intended to be disclosed individually and mutually independently, as limitations to the disclosure and the claimed specific matters both originally filed, separately from a construction of the features described in the embodiments and/or the claims. Furthermore, descriptions as to all numerical ranges and groups or sets are intended to disclose intermediate constituent elements thereof, as limitations to the disclosure and the claimed specific matters both originally filed.

EMBODIMENT

With reference to the drawings, an electric vehicle 10 of an embodiment will be described. As shown in FIG. 1, the electric vehicle 10 includes a body 12 and a plurality of wheels 14f, 14r. The body 12 is constituted of metal, although not particularly limited thereto. The body 12 defines a passenger compartment and a luggage compartment therein. The plurality of wheels 14f, 14r includes a pair of front wheels 14f and a pair of rear wheels 14r. The number of the wheels 14f, 14r is not limited to four.

The electric vehicle 10 further includes a motor 16, a battery unit 18, a power control unit 20, and an electronic control unit 22. The motor 16 is configured to drive at least one of the plurality of wheels 14f, 14r (e.g., the pair of rear wheels 14r). The battery unit 18 is connected to the motor 16 via the power control unit 20 and is configured to supply power to the motor 16. The battery unit 18 houses a plurality of secondary cells and is configured to be repeatedly rechargeable with external power. The power control unit 20 houses a DC-DC converter and/or an inverter and is configured to control power transmitted between the battery unit 18 and the motor 16. The electronic control unit 22 includes a processor and is configured to give a control command to the power control unit 20 in response to, for example, an operation by a user. In place of or in addition to the battery unit 18, the electric vehicle 10 may include another power supply such as a fuel cell unit or a photovoltaic cell panel.

Each of the motor 16, the battery unit 18, and the power control unit 20 is a so-called high-voltage component, and is an electrical component that operates, for example, at an AC voltage exceeding 30 volts or a DC voltage exceeding 60 volts. On the other hand, the electronic control unit 22 is a low-voltage component which is not classified as a high-voltage component. It is desired that the high-voltage components, such as the motor 16, the battery unit 18, and the power control unit 20, are protected against damage when a collision occurs to the electric vehicle 10. Therefore, the motor 16, the battery unit 18, and the power control unit 20 are disposed away from a rear surface 10r of the electric vehicle 10 to avoid being damaged by a rear-end collision, although they are disposed in a rear portion 12r of the body 12. On the other hand, the electronic control unit 22, which is a low-voltage component, is disposed rearward of the motor 16 and the power control unit 20 in the front-rear direction in the rear portion 12r of the body 12. The electronic control unit 22 is an example of the low-voltage component disposed in the rear portion 12r of the body 12.

Figure 2:
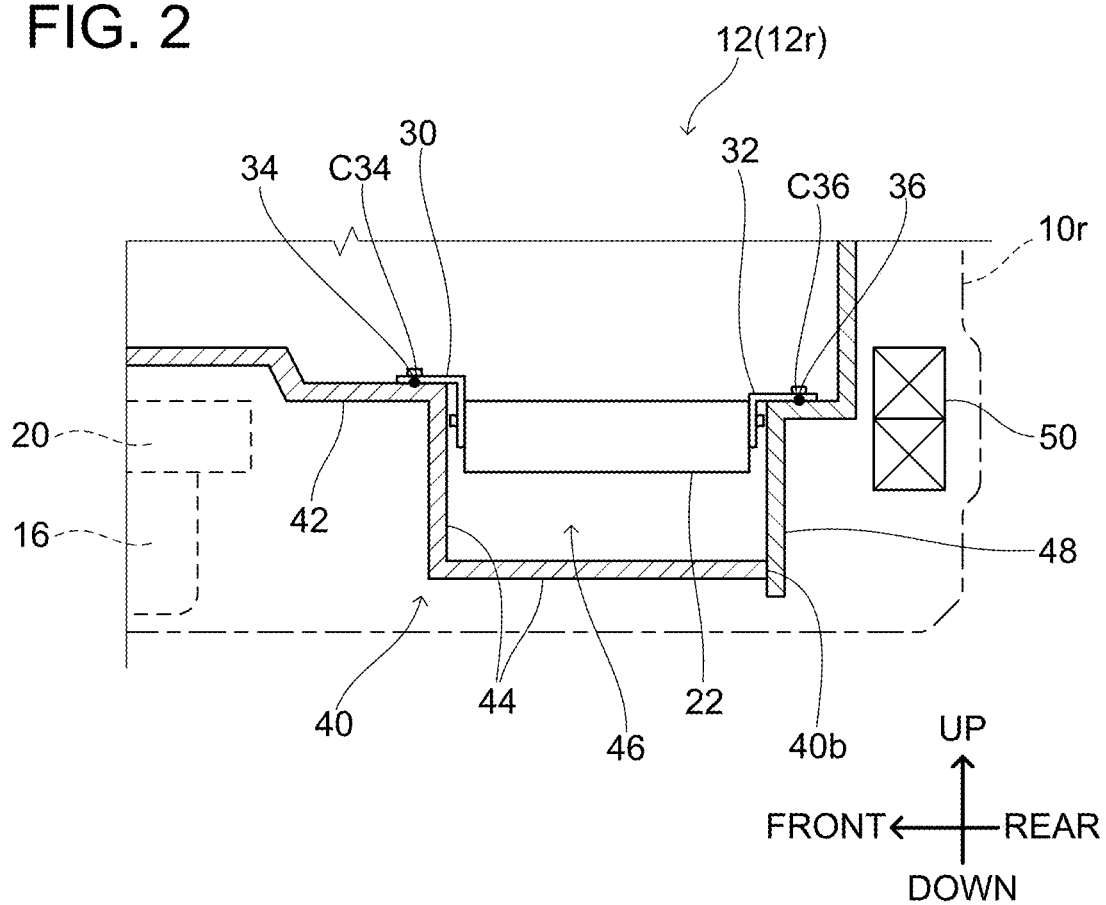
FIG. 2 is a side view schematically showing a configuration of a rear portion 12r of a body 12.
Figure 3:
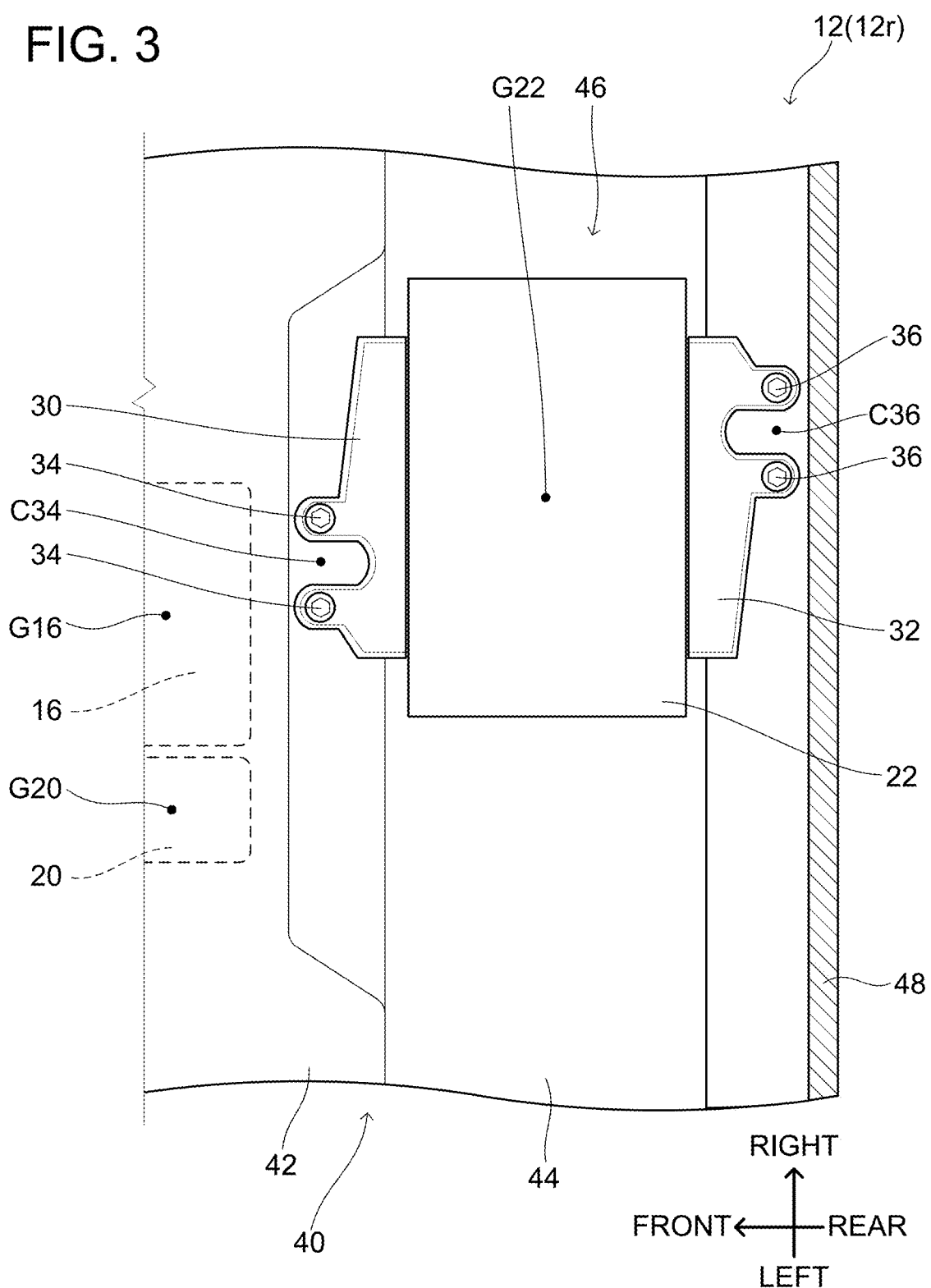
FIG. 3 is a plan view schematically showing the configuration of the rear portion 12r of the body 12.

As shown in FIGS. 2 and 3, the rear portion 12r of the body 12 includes a rear floor panel 40 and a back panel 48. The rear floor panel 40 forms a floor in the rear portion 12r of the body 12. The back panel 48 is located rearward of the power control unit 20 and forms a rear wall in the rear portion 12r of the body 12. A rear end 40b of the rear floor panel 40 is connected to the back panel 48. The electronic control unit 22 is disposed in the luggage compartment defined by the rear floor panel 40, the back panel 48, and a pair of side panels (not shown). Moreover, the body 12 further includes a bumper reinforcement 50 disposed rearward of the back panel 48. The bumper reinforcement 50 extends along the back panel 48 in the lateral direction.

As an example, the rear floor panel 40 of the present embodiment includes a front area 42 and a rear area 44 extending between the front area 42 and the back panel 48. The rear area 44 is recessed downwardly with respect to the front area 42 and defines a recess 46 between the front area 42 and the back panel 48. The electronic control unit 22 is disposed in the recess 46 of the rear floor panel 40. On the other hand, the motor 16 and the power control unit 20 are located outside the rear floor panel 40 and forward of the recess 46. The electronic control unit 22 is located between the bumper reinforcement 50 and the motor 16 and the power control unit 20 in the front-rear direction.

The electronic control unit 22 is secured to a plurality of securing portions 34, 36 of the body 12 with a plurality of brackets 30, 32. The plurality of securing portions 34, 36 includes two first securing portions 34 located forward of the electronic control unit 22 in the front-rear direction, and two second securing portions 36 located rearward of the electronic control unit 22 in the front-rear direction. The two first securing portions 34 are located on the front area 42 of the rear floor panel 40 and the two second securing portions 36 are located on the back panel 48, although not particularly limited so. As shown in FIG. 2, the two first securing portions 34 and the two second securing portions 36 are located at different positions in the vertical direction. Specifically, a center C34 of the two first securing portions 34 is located higher in the vertical direction than a center C36 of the two second securing portions 36. Moreover, as shown in FIG. 3, the center C34 of the two first securing portions 34 and the center C36 of the two second securing portions 36 are also at different positions from each other in the lateral direction.

The plurality of brackets 30, 32 is an example of a coupling member and includes a first bracket 30 and a second bracket 32. The first bracket 30 is attached to a front surface of the electronic control unit 22 and is secured to the two first securing portions 34 of the body 12. The second bracket 32 is attached to a rear surface of the electronic control unit 22 and is secured to the two second securing portions 36 of the body 12. Each of the first bracket 30 and the second bracket 32 is configured of a single component, but may be configured of a plurality of bracket members. Moreover, the number of the first securing portions 34 and the number of the second securing portions 36 are not limited to two.

Figure 4:
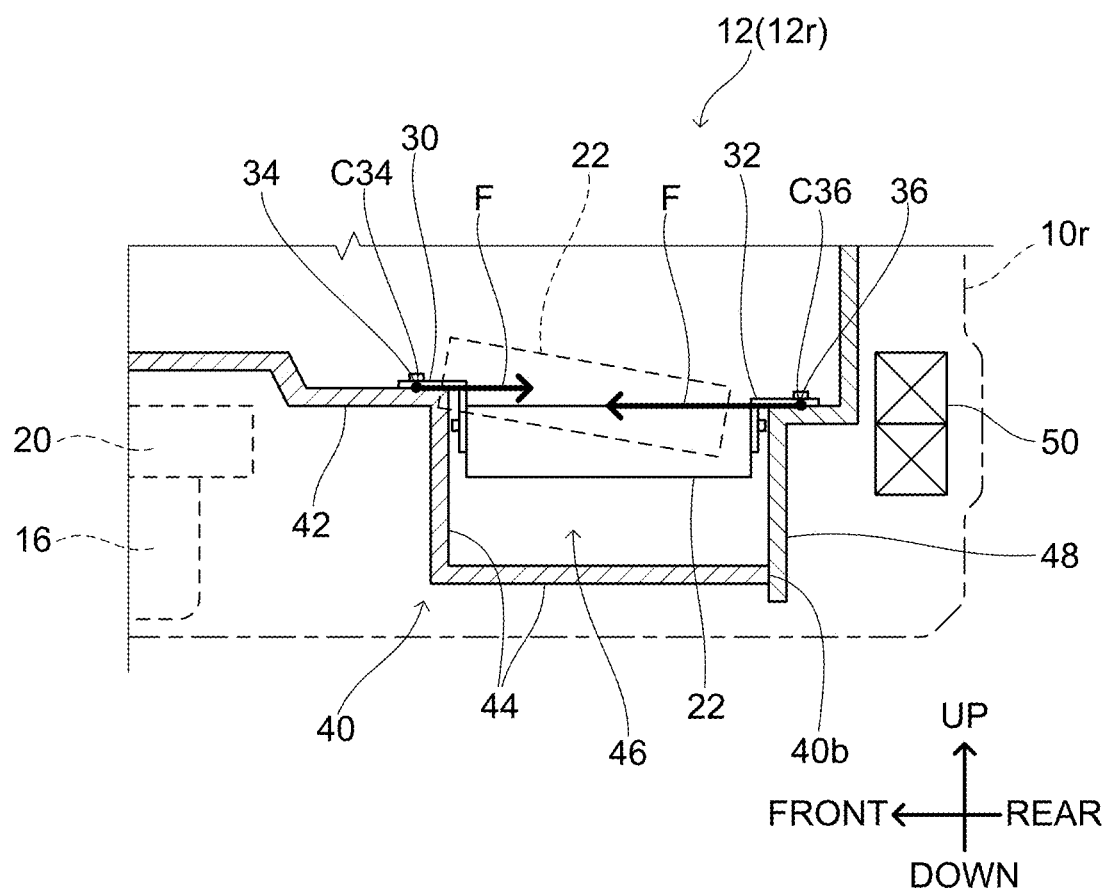
FIG. 4 is a side view schematically showing how an electronic control unit 22 behaves in a rear-end collision.

As shown in FIG. 4, when a rear-end collision occurs to the electric vehicle 10, a compressive force F is applied to the electronic control unit 22 in the front-rear direction from the first securing portions 34 and the second securing portions 36 of the body 12. As described before, the first securing portions 34 located forward of the electronic control unit 22 and the second securing portions 36 located rearward of the electronic control unit 22 are at different positions in the vertical direction. Thus, when receiving the compressive force F from the body 12, the electronic control unit 22 is not simply pushed forward but changes its orientation by rotating upwardly or downwardly. In addition, since the second securing portions 36 are located below the first securing portions 34, the electronic control unit 22 is pushed upwardly when receiving the compressive force F. This suppresses forward movement of the electronic control unit 22, and thus intrusion of the electronic control unit 22 into the high-voltage components such as the motor 16 and the power control unit 20 can be avoided or the degree of the intrusion can be suppressed.

Figure 5:
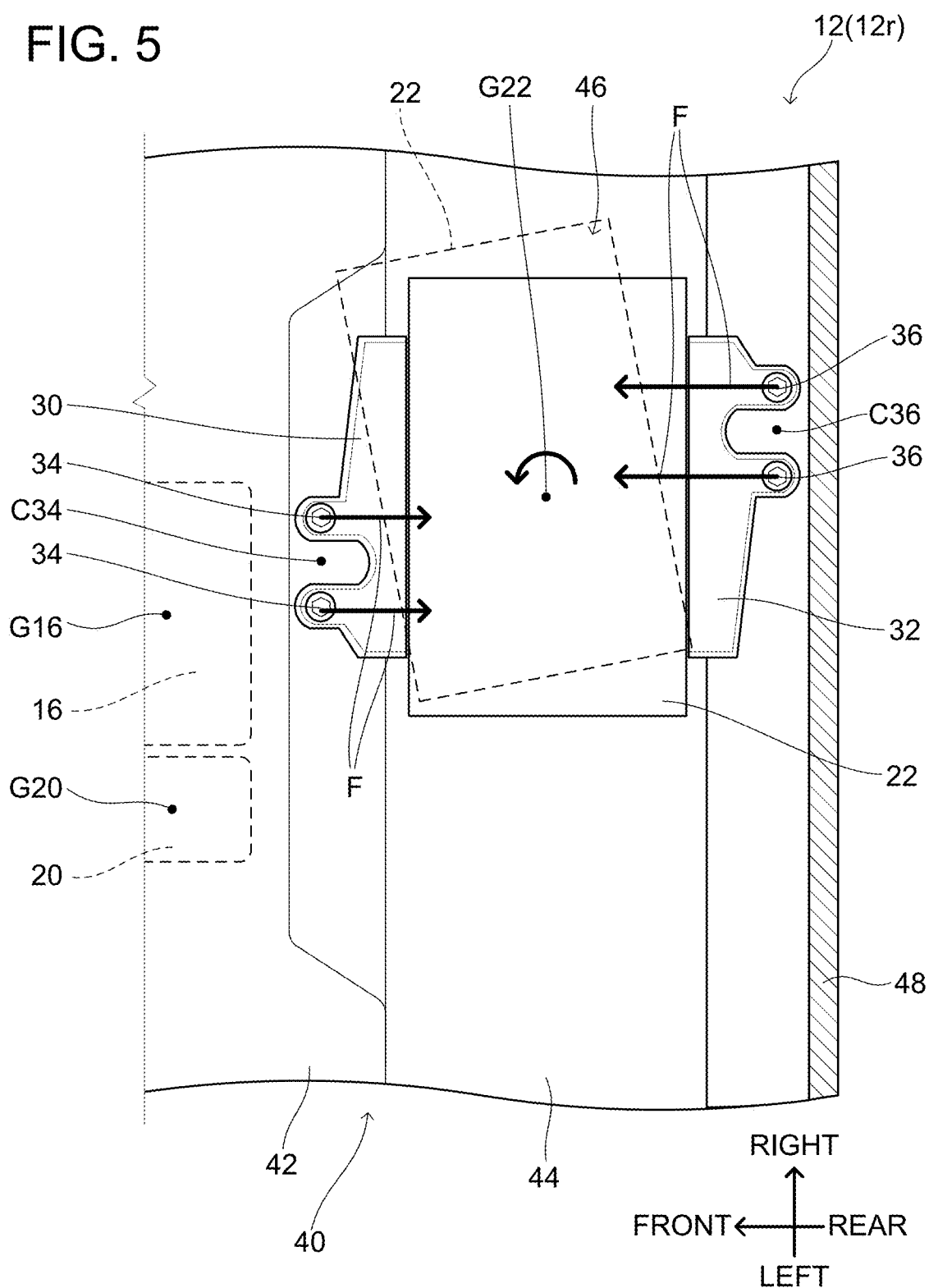
FIG. 5 is a plan view schematically showing how the electronic control unit 22 behaves in a rear-end collision.

In addition, the center C34 of the two first securing portions 34 and the center C36 of the two second securing portions 36 are at different positions from each other in the lateral direction, as well. Therefore, as shown in FIG. 5, when receiving the compressive force F from the body 12 in a rear-end collision, the electronic control unit 22 changes its orientation by rotating leftward or rightward. This further suppresses forward movement of the electronic control unit 22. Here, the motor 16 and the power control unit 20, which are the high-voltage components, and the electronic control unit 22 are partially at the same position in the lateral direction. It should be noted that a center of gravity G16 of the motor 16 and a center of gravity G20 of the power control unit 20 each are offset to the left from a center of gravity G22 of the electronic control unit 22. In contrast to this, the center C36 of the two second securing portions 36 is offset to the right from the center C34 of the two first securing portions 34. Such a configuration enables the electronic control unit 22 to be pushed away from the motor 16 and the power control unit 20 in the vehicle lateral direction, when the electronic control unit 22 receives the compressive force F from the body 12 in a rear-end collision. This can effectively avoid intrusion of the low-voltage component into the high-voltage components or reduce the degree of the intrusion.

Figure 6:
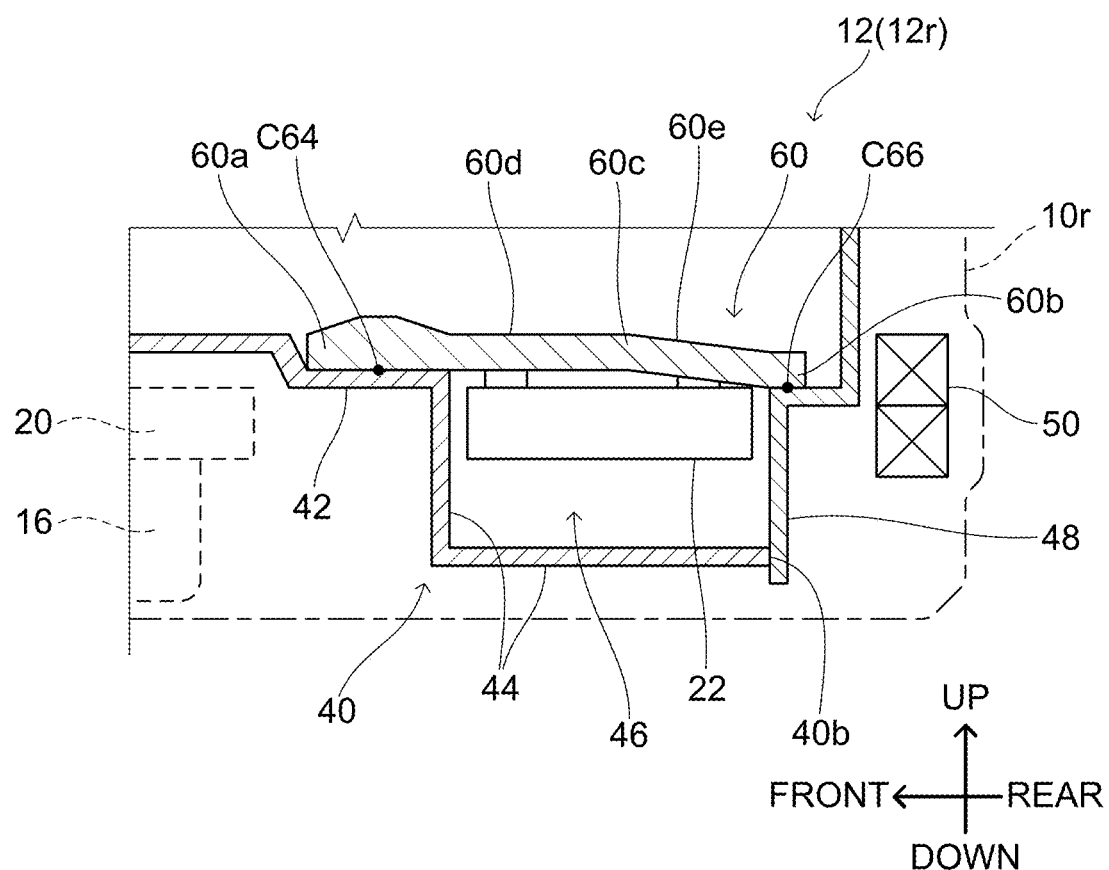
FIG. 6 is a side view schematically showing a configuration of the rear portion 12r of the body 12 in a variant.
Figure 7:
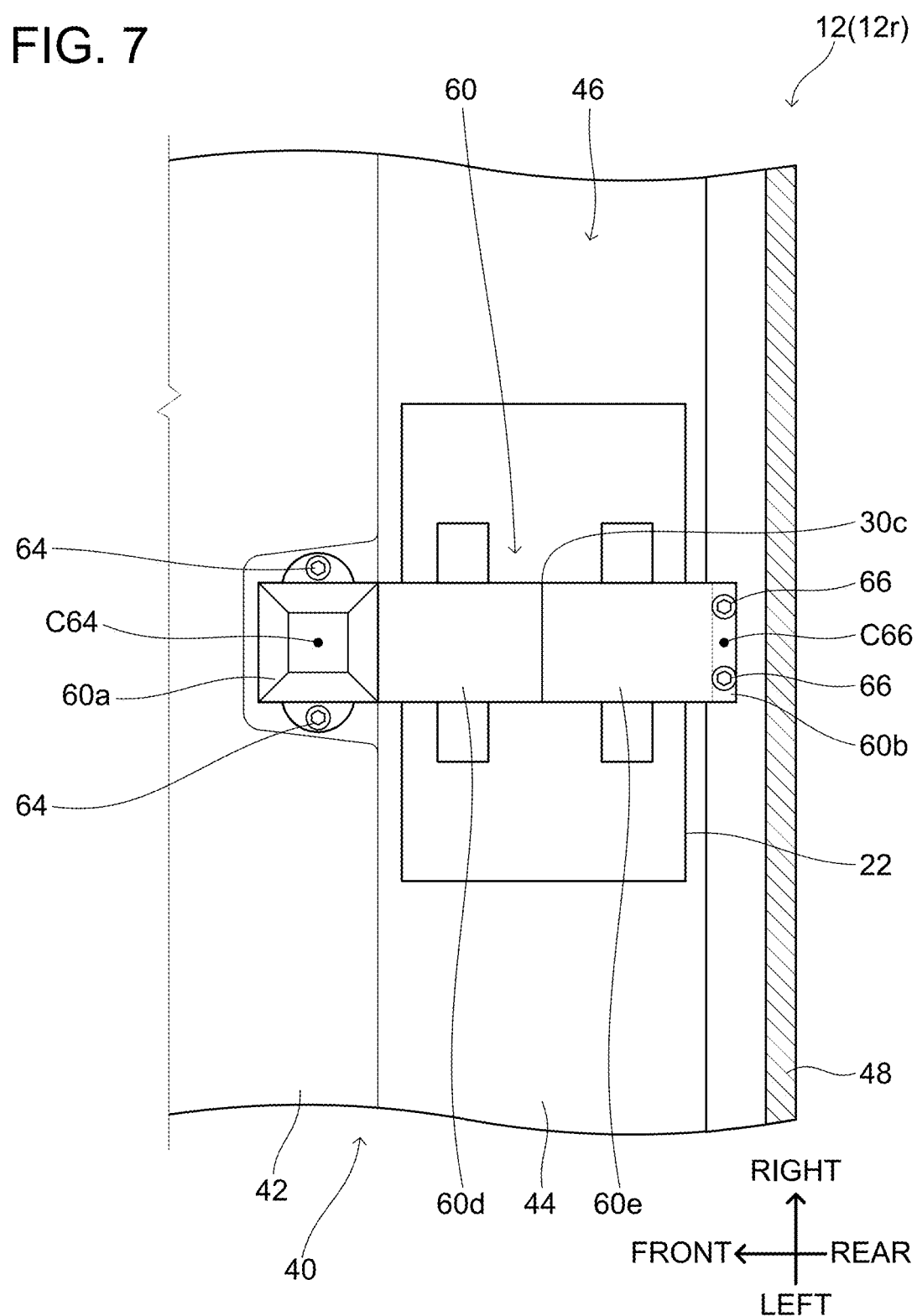
FIG. 7 is a plan view schematically showing the configuration of the rear portion 12r of the body 12 in the variant.

In the above-described embodiment, the electronic control unit 22 is secured to the body 12 with the two brackets 30, 32. In contrast to this, as shown in FIGS. 6 and 7, the electronic control unit 22 may be secured to the body 12 with a single brace 60. In other words, the brace 60 is another example of the coupling member that secures the electronic control unit 22 to a plurality of securing portions 64, 66 of the body 12. The brace 60 is constituted of metal, such as steel. In another embodiment, the brace 60 may be constituted of another material, such as fiber-reinforced resin. The brace 60 is secured to the body 12 and extends in the front-rear direction. As an example, the brace 60 is located higher than the electronic control unit 22 in the vertical direction and supports the electronic control unit 22 from above. In another embodiment, the brace 60 may be located below the electronic control unit 22 in the vertical direction, or may be located laterally to the electronic control unit 22. Moreover, the electronic control unit 22 may be secured to the body 12 with two or more braces 60.

A front end 60a of the brace 60 is secured to two first securing portions 64 located in the front area 42 of the rear floor panel 40, for example, with bolts. On the other hand, a rear end 60b of the brace 60 is secured to two second securing portions 66 located on the back panel 48, for example, with bolts. As in the above-described embodiment, a center C64 of the two first securing portions 64 is located higher in the vertical direction than a center C66 of the two second securing portions 66. On the other hand, the two centers C64, C66 are at the same position in the lateral direction. In another embodiment, the front end 60a and/or the rear end 60b of the brace 60 may be secured to the body 12 by welding or another means. The number of the first securing portions 64 and the number of the second securing portions 66 are not limited to two, and may be one, or three or more.

Figure 8:
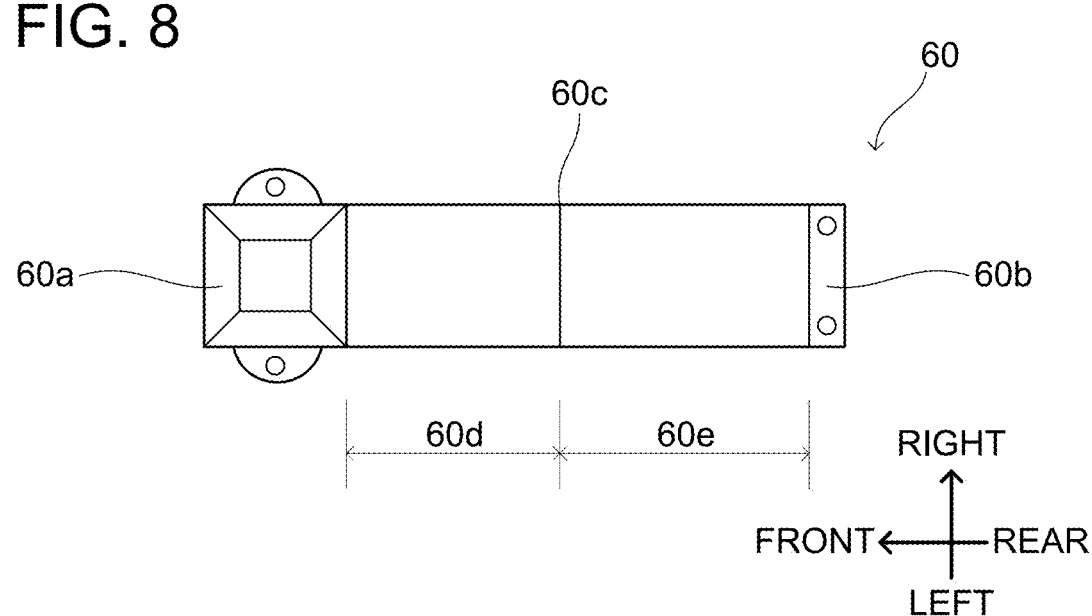
FIG. 8 is a plan view of a brace 60.
Figure 9:
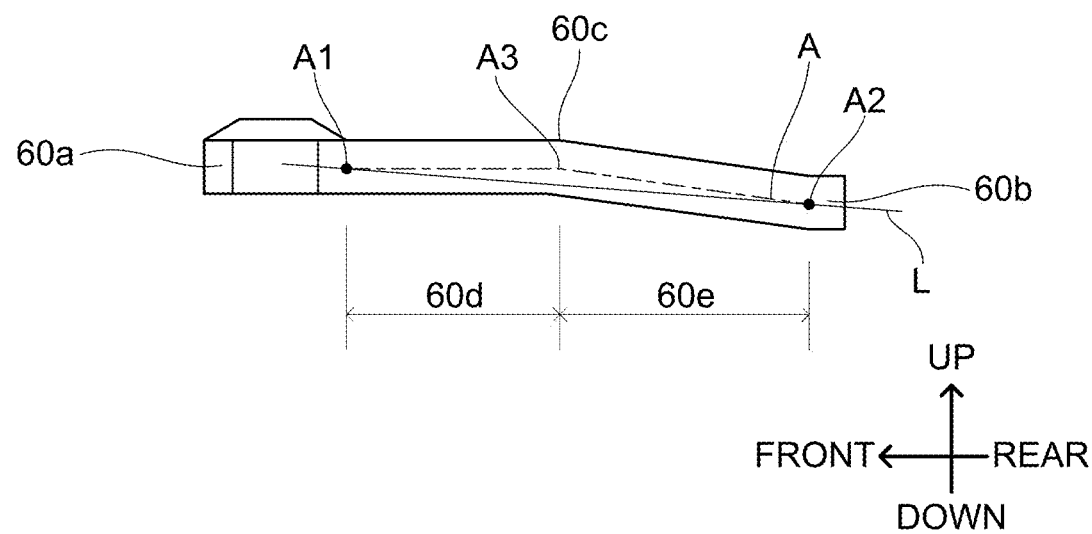
FIG. 9 is a side view of the brace 60.

As shown in FIGS. 8 and 9, the brace 60 includes a bend 60c located between the front end 60a and the rear end 60b and has a shape that is bent in a substantially mountain fold. The bend 60c of the brace 60 is therefore located higher in the vertical direction than a straight line L connecting the front end 60a and the rear end 60b of the brace 60. The brace 60 has a certain thickness, and each part of the front end 60a and the rear end 60b secured to the body 12 may have various shapes according to the shape of the body 12. Thus, to exactly define the shape of the brace 60, with respect to a central axis A extending in a longitudinal direction of the brace 60 in sections 60d, 60e between the front end 60a and the rear end 60b of the brace 60, a position A3 of the central axis A at the bend 60c is located higher in the vertical direction than the straight line L connecting ends A1, A2 of the central axis A, as shown in FIG. 9. The number of the bend 60c is not limited to one, and the brace 60 may be provided with a plurality of bends 60c. In this case, at least one of the plurality of bends 60c may be located higher in the vertical direction than the straight line L connecting the front end 60a and the rear end 60b of the brace 60.

Figure 10:
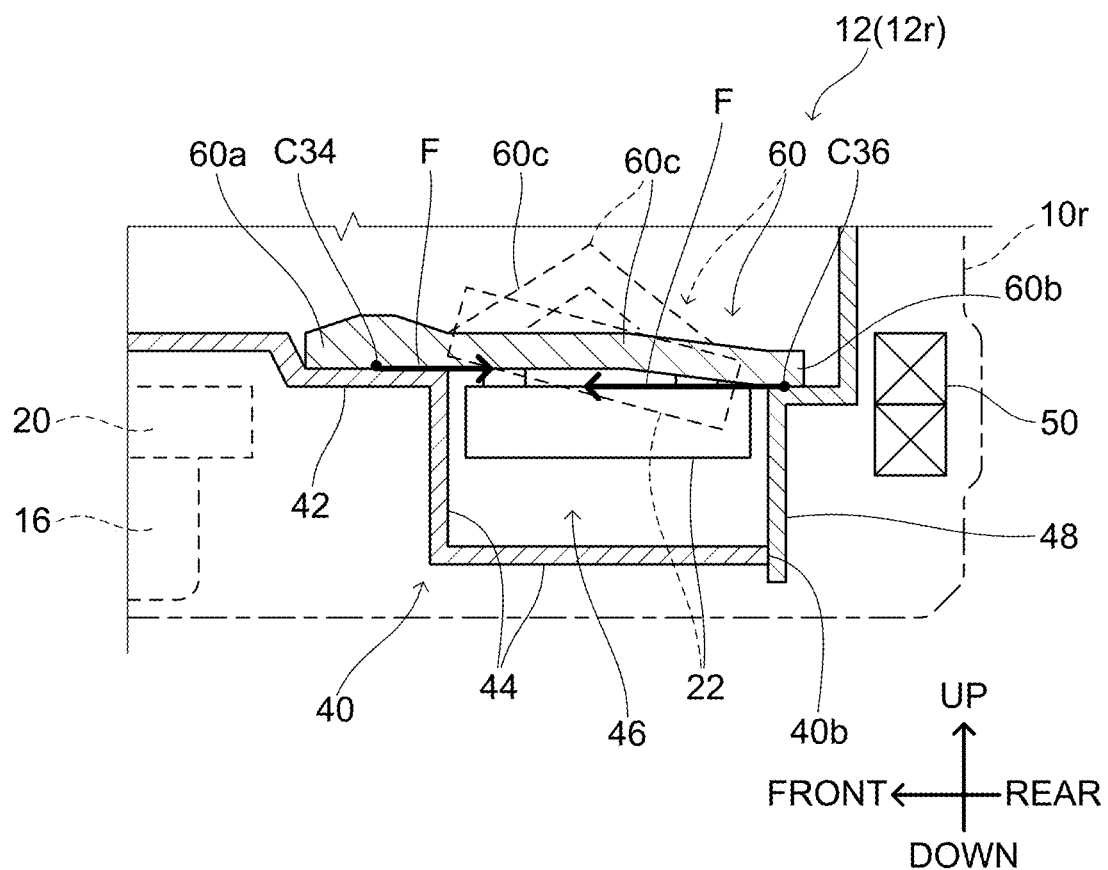
FIG. 10 schematically shows how the brace 60 and the electronic control unit 22 behave in a rear-end collision in the variant.

According to the above-described structure, as shown in FIG. 10, the compressive force F is applied to the brace 60, which extends in the front-rear direction, from the rear end 60b toward the front end 60a when a rear-end collision occurs to the electric vehicle 10. At this time, due to the bend 60c at an intermediate position of the brace 60, the brace 60 deforms to bend at the bend 60c. In particular, the bend 60c of the brace 60 is located higher in the vertical direction than the straight line L connecting the front end 60a and the rear end 60b of the brace 60 (see FIG. 9). The brace 60 therefore bends to cause the bend 60c to protrude upwardly (i.e., in a mountain fold shape), and the electronic control unit 22 is thereby lifted upwardly. Since forward movement of the electronic control unit 22 can be suppressed by the electronic control unit 22 being lifted upwardly, intrusion of the electronic control unit 22 into an element located forward of and/or below the electronic control unit 22, such as the high-voltage component including the motor 16 and the power control unit 20, can be avoided or the degree of the intrusion can be reduced. The front end 60a of the brace 60 has a thickness larger than that of the section 60d adjacent to the front end 60a. Thus, stress is likely to concentrate at a boundary position between the front end 60a and the section 60d adjacent thereto, and the brace 60 is also designed to bend at that position.

In the electric vehicle 10 of the present embodiment, the rear end 60b of the brace 60 is located below the front end 60a of the brace 60. Such a configuration facilitates deformation of the brace 60 into an intended shape (i.e., a mountain fold shape shown in FIG. 10) when a rear-end collision occurs to the electric vehicle 10, thus the electronic control unit 22 can be pushed upwardly with certainty. In addition, as shown in FIGS. 8 and 9, the section 60e ranging from the bend 60c to the rear end 60b of the brace 60 is tilted downwardly toward the rear end 60b. This also facilitates deformation of the brace 60 into the intended shape when a rear-end collision occurs to the electric vehicle 10, thus the electronic control unit 22 can be pushed upwardly with certainty. On the other hand, the section 60d ranging from the front end 60a to the bend 60c of the brace 60 extends horizontally along the front-rear direction, although not particularly limited so.

As described above, the rear end 60b of the brace 60 being located below the front end 60a of the brace 60 in the vertical direction facilitates deformation of the brace 60 into the mountain fold shape in a rear-end collision. Therefore, the brace 60 may not be necessarily provided with the bend 60c at the intermediate position thereof, when the rear end 60b of the brace 60 is located below the front end 60a of the brace 60 in the vertical direction. Similarly, the bend 60c of the brace 60 facilitates deformation of the brace 60 into the mountain fold shape in a rear-end collision. Therefore, the rear end 60b of the brace 60 may not be necessarily located below the front end 60a of the brace 60 in the vertical direction, when the brace 60 is provided with the bend 60c. Moreover, in the present variant with the brace 60 as well, the center C64 of the at least one first securing portion 64 and the center C66 of the at least one second securing portion 66 may be at different positions from each other in the lateral direction, as in the above-described embodiment.

What is claimed is:

1. An electric vehicle comprising:
   a body;
   a low-voltage component disposed in a rear portion of the body; and
   at least one coupling member securing the low-voltage component to a plurality of securing portions of the body,
   wherein
   the plurality of securing portions includes at least one first securing portion located forward of the low-voltage component in a vehicle front-rear direction and at least one second securing portion located rearward of the low-voltage component in the vehicle front-rear direction,
   a center of the at least one first securing portion and a center of the at least one second securing portion are located at different positions from each other in a vehicle vertical direction,
   the body comprises:
     a rear floor panel forming a floor at the rear portion of the body, and
     a back panel which is located rearward of the low-voltage component and to which a rear end of the rear floor panel is connected,
   the at least one first securing portion is located on the rear floor panel, and
   the at least one second securing portion is located on the back panel.

2. The electric vehicle according to claim 1, wherein
   the center of the at least one first securing portion is located higher than the center of the at least one second securing portion in the vehicle vertical direction.

3. The electric vehicle according to claim 1, wherein
   the rear floor panel comprises a front area including the at least one first securing portion, and a rear area extending between the front area and the back panel and recessed downwardly with respect to the front area, and the low-voltage component is disposed in a recess defined by the back panel and the rear area of the rear floor panel.

4. The electric vehicle according to claim 3, wherein the low-voltage component is entirely below the front area of the rear floor panel.

5. The electric vehicle according to claim 1, wherein
   the at least one coupling member comprises:
     a first bracket configured to secure the low-voltage component to the at least one first securing portion of the body; and
     a second bracket configured to secure the low-voltage component to the at least one second securing portion of the body.

6. The electric vehicle according to claim 1, wherein
   the at least one coupling member comprises a brace extending in the vehicle front-rear direction,
   a front end of the brace is secured to the at least one first securing portion, and
   a rear end of the brace is secured to the at least one second securing portion.

7. The electric vehicle according to claim 6, wherein
   the brace comprises a bend located between the front end and the rear end of the brace, and
   the bend is located higher in the vehicle vertical direction than a straight line connecting the front end and the rear end of the brace.

8. The electric vehicle according to claim 1, wherein the center of the at least one first securing portion and the center of the at least one second securing portion are at different positions from each other in a vehicle lateral direction.

9. The electric vehicle according to claim 1, further comprising a high-voltage component located forward of the low-voltage component in the vehicle front-rear direction.

10. The electric vehicle according to claim 9, wherein the high-voltage component comprises at least one selected from the group consisting of (i) a motor configured to drive a wheel and (ii) a power control unit connected to the motor.

11. The electric vehicle according to claim 9, wherein at least a part of the low-voltage component and at least a part of the high-voltage component are at a same position in a vehicle lateral direction.

12. The electric vehicle according to claim 11, wherein
    a center of gravity of the high-voltage component is offset to one side in the vehicle lateral direction from a center of gravity of the low-voltage component, and
    the center of the at least one second securing portion is offset to another side in the vehicle lateral direction from the center of the at least one first securing portion.

13. The electric vehicle according to claim 1, wherein the low-voltage component is an electronic control unit comprising at least one processor.

14. An electric vehicle, comprising:
    a body;
    a low-voltage component disposed in a rear portion of the body; and
    at least one coupling member securing the low-voltage component to a plurality of securing portions of the body,
    wherein
    the plurality of securing portions includes at least one first securing portion located forward of the low-voltage component in a vehicle front-rear direction and at least one second securing portion located rearward of the low-voltage component in the vehicle front-rear direction, a center of the at least one first securing portion and a center of the at least one second securing portion are located at different positions from each other in a vehicle vertical direction, the at least one coupling member comprises a brace extending in the vehicle front-rear direction, a front end of the brace is secured to the at least one first securing portion, and a rear end of the brace is secured to the at least one second securing portion.

15. The electric vehicle according to claim 14, wherein the brace comprises a bend located between the front end and the rear end, and the bend is located higher in the vehicle vertical direction than a straight line connecting the front end and the rear end.

16. The electric vehicle according to claim 14, further comprising a high-voltage component located forward of the low-voltage component in the vehicle front-rear direction, wherein the high-voltage component comprises at least one selected from the group consisting of (i) a motor configured to drive a wheel and (ii) a power control unit connected to the motor.

17. An electric vehicle, comprising:

a body;

a low-voltage component disposed in a rear portion of the body;

at least one coupling member securing the low-voltage component to a plurality of securing portions of the body; and a high-voltage component located forward of the low-voltage component in a vehicle front-rear direction, wherein the plurality of securing portions includes at least one first securing portion located forward of the low-voltage component in a vehicle front-rear direction and at least one second securing portion located rearward of the low-voltage component in the vehicle front-rear direction, a center of the at least one first securing portion and a center of the at least one second securing portion are located at different positions from each other in a vehicle vertical direction, and at least a part of the low-voltage component and at least a part of the high-voltage component are at a same position in a vehicle lateral direction.

18. The electric vehicle according to claim 17, wherein a center of gravity of the high-voltage component is offset to one side in the vehicle lateral direction from a center of gravity of the low-voltage component, and the center of the at least one second securing portion is offset to another side in the vehicle lateral direction from the center of the at least one first securing portion.

19. The electric vehicle according to claim 17, wherein the high-voltage component comprises at least one selected from the group consisting of (i) a motor configured to drive a wheel and (ii) a power control unit connected to the motor.

* * * * *